United States Patent
Lin et al.

(10) Patent No.: US 12,004,166 B2
(45) Date of Patent: Jun. 4, 2024

(54) INFORMATION TRANSMISSION METHOD AND APPARATUS, DEVICE, AND STORAGE MEDIUM

(71) Applicant: Guangdong OPPO Mobile Telecommunications Corp., Ltd., Dongguan (CN)

(72) Inventors: Yanan Lin, Dongguan (CN); Jing Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/230,252

(22) Filed: Aug. 4, 2023

(65) Prior Publication Data
US 2023/0379919 A1 Nov. 23, 2023

Related U.S. Application Data

(63) Continuation of application No. PCT/CN2021/081181, filed on Mar. 16, 2021.

(51) Int. Cl.
*H04W 72/21* (2023.01)
*H04L 1/12* (2006.01)
(Continued)

(52) U.S. Cl.
CPC ............ *H04W 72/21* (2023.01); *H04L 1/12* (2013.01); *H04W 72/0446* (2013.01); *H04W 72/11* (2023.01)

(58) Field of Classification Search
CPC . H04W 72/21; H04W 72/11; H04W 72/0446; H04L 1/12
See application file for complete search history.

(56) References Cited

U.S. PATENT DOCUMENTS 11,777,666 B2 * 10/2023 Yang ..................... H04L 1/1861
370/329
2019/0297040 A1 * 9/2019 White ..................... H04L 51/08
(Continued)

FOREIGN PATENT DOCUMENTS

CN 107231217 A 10/2017
CN 110830176 A 2/2020
(Continued)

OTHER PUBLICATIONS

International Search Report and Written Opinion in related PCT Application No. PCT/CN2021/081181 dated Dec. 7, 2021 (13 pages).

(Continued)

Primary Examiner — Brian D Nguyen
(74) Attorney, Agent, or Firm — BAYES PLLC

(57) ABSTRACT

The present application relates to the field of mobile communications, and discloses an information transmission method and apparatus, a device, and a storage medium. The method comprises: determining at least one piece of feedback information associated with a first time domain unit, the at least one piece of feedback information comprising unpostponed feedback information and postponed feedback information, the unpostponed feedback information comprising feedback information corresponding to a first SPS PDSCH, the postponed feedback information comprising feedback information that is not successfully transmitted in a second time domain unit, and the feedback information that is not successfully transmitted in the second time domain unit being feedback information corresponding to a second SPS PDSCH; determining at least one PUCCH resource according to the at least one piece of feedback information; and according to the at least one PUCCH
(Continued)

resource, determining feedback information transmitted in the first time domain unit.

20 Claims, 7 Drawing Sheets

(51) Int. Cl.
*H04W 72/0446* (2023.01)
*H04W 72/11* (2023.01)

(56) References Cited

U.S. PATENT DOCUMENTS

| | | | |
|---|---|---|---|
| 2023/0269719 A1* | 8/2023 | Dimou | H04L 1/1864 370/329 |
| 2023/0276359 A1* | 8/2023 | Xu | H04W 72/25 370/318 |
| 2023/0308224 A1* | 9/2023 | Babaei | H04L 1/1812 370/329 |
| 2023/0318755 A1* | 10/2023 | Zeng | H04W 76/28 370/329 |
| 2023/0319842 A1* | 10/2023 | Nogami | H04W 72/232 370/329 |

FOREIGN PATENT DOCUMENTS

| | | |
|---|---|---|
| CN | 111431681 A | 7/2020 |
| WO | 2021026909 A1 | 2/2021 |

OTHER PUBLICATIONS

Moderator Summary #2 on HARQ-ACK Feedback Ehancements for NR Rel-17 URLLC/IIoT (R1-2101818) Jan. 25-Feb. 5, 2021 (175 pages).
Extended European Search Report issued in corresponding European application No. 21930755.0, mailed Feb. 19, 2024.
Source: TCL Communication; Title: UE feedback enhancements for HARQ-ACK 3GPP TSG RAN WG1 Meeting #104-e R1-2100920 e-Meeting, Jan. 25-Feb. 5, 2021.

* cited by examiner

INFORMATION TRANSMISSION METHOD AND APPARATUS, DEVICE, AND STORAGE MEDIUM

CROSS REFERENCE TO RELATED APPLICATIONS

The present application is a continuation of International Application No. PCT/CN2021/081181, filed on Mar. 16, 2021, and the entire contents thereof are incorporated herein by reference.

TECHNICAL FIELD

The present disclosure relates to the field of mobile communication, in particular to an information transmission method, an apparatus, a device and a storage medium.

BACKGROUND

In the wireless communication system, SPS (Semi Persistent Schedule, semi-static) data can be used between the terminal device and the network device. The network device configures SPS transmission parameters for the terminal device, and the terminal device determines the transmission resource configured by the network device according to the SPS transmission parameters configured by the network device. The network device sends SPS PDSCH (Physical Downlink Shared Channel) on the transmission resource, and the terminal device sends corresponding feedback information to the network device according to the received SPS PDSCH.

SUMMARY

Embodiments of the present application provide an information transmission method, apparatus, device, and storage medium.

According to one aspect of the present application, an information transmission method is provided, which is applied to a terminal device, and the method includes:
  determining at least one piece of feedback information associated with a first time domain unit, wherein the at least one piece of feedback information includes undeferred feedback information and deferred feedback information, the undeferred feedback information includes feedback information corresponding to a first SPS PDSCH, and the first time domain unit is a time domain unit used to transmit feedback information corresponding to the first SPS PDSCH determined according to a feedback duration, and the deferred feedback information includes feedback information that was not successfully transmitted in a second time domain unit, and the feedback information that was not successfully transmitted in the second time domain unit is the feedback information corresponding to a second SPS PDSCH, and the second time domain unit is a time domain unit used to transmit feedback information corresponding to the second SPS PDSCH determined according to the feedback duration, and wherein the second time domain unit is located before the first time domain unit;
  determining at least one PUCCH (Physical Uplink Control Channel) resource according to the at least one piece of feedback information; and
  determining feedback information sent in the first time domain unit according to the at least one PUCCH resource.

According to one aspect of the present application, an information transmission method is provided, which is applied to a network device, and the method further includes:
  determining at least one piece of feedback information associated with a first time domain unit, wherein the at least one piece of feedback information includes undeferred feedback information and deferred feedback information, the undeferred feedback information includes feedback information corresponding to a first SPS PDSCH, and the first time domain unit is a time domain unit used to transmit feedback information corresponding to the first SPS PDSCH determined according to a feedback duration, and the deferred feedback information includes feedback information that was not successfully transmitted in a second time domain unit, and the feedback information that was not successfully transmitted in the second time domain unit is the feedback information corresponding to a second SPS PDSCH, and the second time domain unit is a time domain unit used to transmit feedback information corresponding to the second SPS PDSCH determined according to the feedback duration, and wherein the second time domain unit is located before the first time domain unit;
  determining at least one PUCCH resource according to the at least one feedback information, and
  determining feedback information received in the first time domain unit according to the at least one PUCCH resource.

According to one aspect of the present application, an information transmission method is provided, which is applied to a terminal device, and the method includes:
  receiving a first SPS PDSCH in a first time domain unit, wherein the first SPS PDSCH carries a first HARQ (Hybrid Automatic Repeat reQuest) process, and feedback information corresponding to the first SPS PDSCH is transmitted in a second time domain unit; and
  if a third time domain unit is included in time domain units before the second time domain unit, and the third time domain unit is used to transmit a second SPS PDSCH, the second SPS PDSCH carries the first HARQ process, invalidating the second SPS PDSCH or the feedback information corresponding to the first SPS PDSCH.

According to one aspect of the present application, an information transmission method is provided, which is applied to a network device, and the method includes:
  sending a first SPS PDSCH in a first time domain unit, wherein the first SPS PDSCH carries a first HARQ process, and feedback information corresponding to the first SPS PDSCH is transmitted in a second time domain unit; and
  if a third time domain unit is included in time domain units before the second time domain unit, and the third time domain unit is used to transmit a second SPS PDSCH, the second SPS PDSCH carries the first HARQ process, determining that the second SPS PDSCH or the feedback information corresponding to the first SPS PDSCH is invalid.

According to one aspect of the present application, an information transmission apparatus is provided, which is configured in a terminal device, and the apparatus includes:

an information determination module, configured to determine at least one piece of feedback information associated with a first time domain unit, wherein the at least one piece of feedback information includes undeferred feedback information and deferred feedback information, the undeferred feedback information includes feedback information corresponding to a first SPS PDSCH, and the first time domain unit is a time domain unit used to transmit feedback information corresponding to the first SPS PDSCH determined according to a feedback duration, and the deferred feedback information includes feedback information that was not successfully transmitted in a second time domain unit, and the feedback information that was not successfully transmitted in the second time domain unit is the feedback information corresponding to a second SPS PDSCH, and the second time domain unit is a time domain unit used to transmit feedback information corresponding to the second SPS PDSCH determined according to the feedback duration, and wherein the second time domain unit is located before the first time domain unit; and a resource determining module, configured to determine at least one PUCCH resource according to the at least one feedback information;

wherein the information determining module is further configured to determine feedback information received in the first time domain unit according to the at least one PUCCH resource.

According to one aspect of the present application, an information transmission apparatus is provided, which is configured in a network device, and the apparatus includes:

an information determination module, configured to determine at least one piece of feedback information associated with a first time domain unit, wherein the at least one piece of feedback information includes undeferred feedback information and deferred feedback information, the undeferred feedback information includes feedback information corresponding to a first SPS PDSCH, and the first time domain unit is a time domain unit used to transmit feedback information corresponding to the first SPS PDSCH determined according to a feedback duration, and the deferred feedback information includes feedback information that was not successfully transmitted in a second time domain unit, and the feedback information that was not successfully transmitted in the second time domain unit is the feedback information corresponding to a second SPS PDSCH, and the second time domain unit is a time domain unit used to transmit feedback information corresponding to the second SPS PDSCH determined according to the feedback duration, and wherein the second time domain unit is located before the first time domain unit; and a resource determining module, configured to determine at least one PUCCH resource according to the at least one feedback information;

wherein the information determination module is further configured to determine feedback information received in the first time domain unit according to the at least one PUCCH resource.

According to one aspect of the present application, an information transmission apparatus is provided, which is configured in a terminal device, and the apparatus includes:

a receiving module, configured to receive a first SPS PDSCH in a first time domain unit, wherein the first SPS PDSCH carries a first HARQ (Hybrid Automatic Repeat reQuest) process, and feedback information corresponding to the first SPS PDSCH is transmitted in a second time domain unit; and a processing module, configured to invalidate, if a third time domain unit is included in time domain units before the second time domain unit, and the third time domain unit is used to transmit a second SPS PDSCH, the second SPS PDSCH carries the first HARQ process, the second SPS PDSCH or the feedback information corresponding to the first SPS PDSCH.

According to one aspect of the present application, an information transmission apparatus is provided, which is configured in a network device, and the apparatus includes:

a sending unit, configured to send a first SPS PDSCH in a first time domain unit, wherein the first SPS PDSCH carries a first HARQ process, and feedback information corresponding to the first SPS PDSCH is transmitted in a second time domain unit; and a determining module, configured to determine, if a third time domain unit is included in time domain units before the second time domain unit, and the third time domain unit is used to transmit a second SPS PDSCH, the second SPS PDSCH carries the first HARQ process, that the second SPS PDSCH or the feedback information corresponding to the first SPS PDSCH is invalid.

According to one aspect of the present application, a terminal device is provided, and the terminal device includes: a processor; a transceiver connected to the processor; a memory for storing executable instructions of the processor; wherein, the processor is configured to load and execute the executable instructions to implement the information transmission method as described in the above aspect.

According to one aspect of the present application, a network device is provided, and the network device includes: a processor; a transceiver connected to the processor; a memory for storing executable instructions of the processor; wherein, the processor is configured to load and execute the executable instructions to implement the information transmission method as described in the above aspect.

According to one aspect of the present application, a computer-readable storage medium is provided, wherein an executable program code is stored in the readable storage medium, and the executable program code is loaded and executed by a processor to implement the information transmission method as described in the above aspect.

According to one aspect of the present application, a chip is provided, the chip includes a programmable logic circuit and/or program instructions, and when the chip is run on a terminal device, it is used to implement the information transmission method as described in the above aspect.

According to one aspect of the present application, an embodiment of the present application provides a computer program product, which is used to implement the information transmission method as described in the above aspect when the computer program product is executed by a processor of a terminal device.

BRIEF DESCRIPTION OF THE DRAWINGS

In order to more clearly illustrate the technical solutions in the embodiments of the present application, the drawings that need to be used in the description of the embodiments will be briefly introduced below. Obviously, the drawings in the following description are only some embodiments of the present application. For those skilled in the art, other drawings can also be obtained based on these drawings without creative effort.

DETAILED DESCRIPTION

In order to make the purpose, technical solution and advantages of the present application more clear, the implementation manners of the present application will be further described in detail below in conjunction with the accompanying drawings.

First of all, the terminology involved in this application is explained firstly.

SPS PDSCH:

In the NR system, there are two data transmission modes: dynamic transmission mode and semi-persistent/semi-static transmission mode. The dynamic transmission is characterized in that the parameters of each data transmission are indicated by corresponding DCI (Downlink Control Information).

In the embodiment, the DCI includes information such as resources used by the PDSCH, a HARQ process number, and the like.

In addition, the semi-persistent/semi-static transmission is characterized in that the transmission resources and transmission methods are both semi-persistent/semi-static configured. The DCI is used to activate/release the corresponding SPS transmission. If the corresponding SPS is activated, subsequent transmissions do not need to send physical layer signaling.

The network device pre-configures the SPS transmission parameters for the terminal device through high-layer signaling.

In some embodiments, the SPS transmission parameters include at least one of:

(1) SPS cycle.
(2) Time domain resources.
(3) PUCCH resources used to transmit feedback information.

In some embodiments, the PUCCH format configured by the network device for the SPS PDSCH to transmit feedback information includes PUCCH format 0 or PUCCH format 1. Wherein, the maximum number of bits of the feedback information carried by PUCCH format 0 or PUCCH format 2 is 2.

After the network device configures the SPS transmission parameters for the terminal device, the SPS is activated through the DCI, and the SPS transmission parameters will be further indicated in the DCI.

In some embodiments, the SPS transmission parameters include at least one of:

(1) Frequency domain resources.
(2) Feedback duration.

Figure 1:
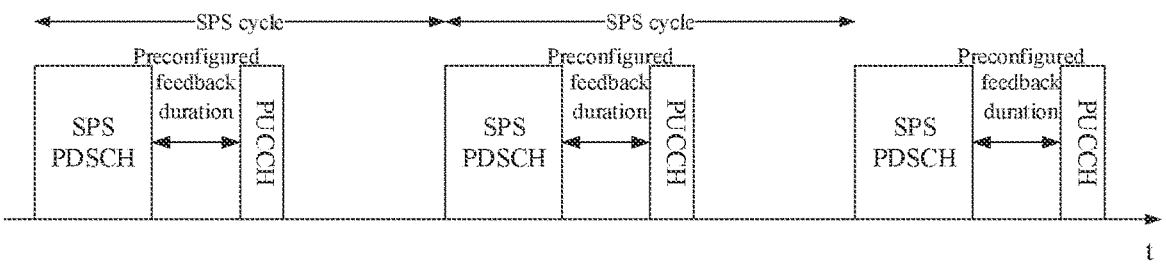
FIG. 1 illustrates a schematic diagram of SPS PDSCH transmission provided by an exemplary embodiment of the present application.

For example, as shown in FIG. 1, after the network device sends the DCI signaling to activate the SRS, if there is no dynamic scheduling in the same time domain resource, the network device will always send a SPS PDSCH, and the terminal device will also send feedback information corresponding to the SPS PDSCH by a PUCCH.

In some embodiments, if the time domain resource determined according to the pre-configured feedback time slot cannot be used to transmit the PUCCH, such as the time domain symbol occupied by the PUCCH is a downlink symbol, the feedback information of the SPS PDSCH will not be transmitted.

Figure 2:
FIG. 2 illustrates a timing flowchart of a PDSCH provided by an exemplary embodiment of the present application.

PDSCH Timing Relationship:

The First Type:

If the terminal device receives the first PDSCH and the HARQ process number corresponding to the first PDSCH is X, before the terminal sends the feedback information corresponding to the first PDSCH, the terminal does not expect the base station to schedule a second PDSCH carrying a HARQ process having the same HARQ process number X with the HARQ process carried by the first PDSCH. That is, as shown in FIG. 2, after transmitting the HARQ process X by the PDSCH 1 and the feedback information corresponding to the HARQ process X is not sent, the base station cannot repeatedly use the same serial number as the HARQ process for data transmission.

Figure 3:
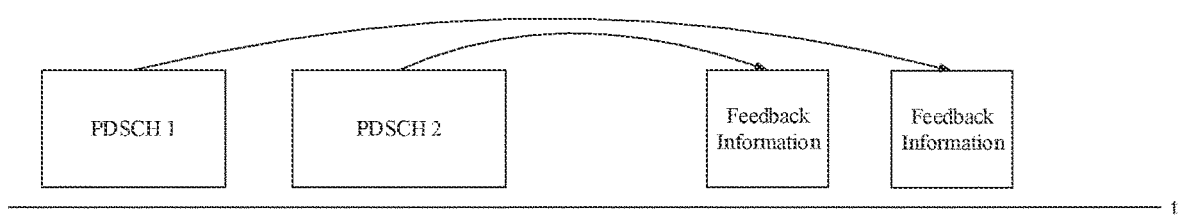
FIG. 3 illustrates a timing flowchart of a PDSCH provided by an exemplary embodiment of the present application.

The Second Type:

The terminal device receives the PDSCH 1 in time slot I, and the feedback information corresponding to PDSCH 1 is transmitted through time slot J. The terminal does not expect to receive the PDSCH 2 whose start symbol is after the start symbol of PDSCH 1, and whose feedback information is before the feedback information corresponding to the PDSCH 1. For example, as shown in FIG. 3, the feedback information of PDSCH 2 scheduled later cannot be transmitted before the feedback information of PDSCH 1.

Figure 4:
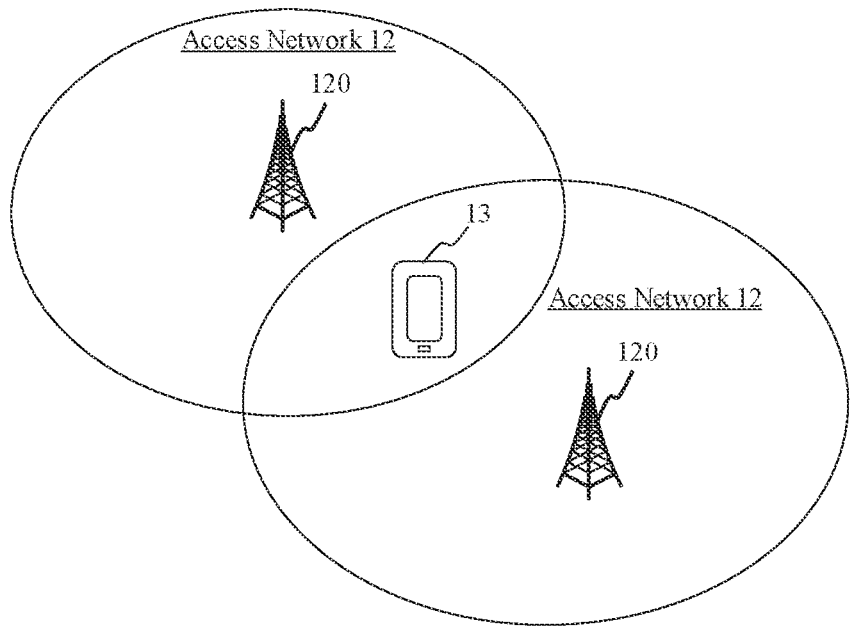
FIG. 4 illustrates a block diagram of a communication system provided by an exemplary embodiment of the present application.

Hereinafter, the application scenario of this application is described:

FIG. 4 shows a block diagram of a communication system provided by an exemplary embodiment of the present application. The communication system may include: an access network 12 and a terminal device 13.

The access network 12 includes several network devices 120. The network device 120 may be a base station, and the base station is a device deployed in an access network to provide a terminal device with a wireless communication function. The base station may include various forms of macro base stations, micro base stations, relay stations, access points and so on. In systems using different radio access technologies, the names of devices with base station functions may be different. For example, in LTE systems, they are referred to as eNodeB or eNB; in 5G NR-U systems, they are referred to as gNodeB or gNB. As communications technology evolves, the description of the "base station" may change. For convenience in this embodiment of the present application, the above-mentioned devices that provide the wireless communication function for the terminal device 13 are collectively referred to as access network devices.

The terminal device 13 may include various handheld devices, vehicle-mounted devices, wearable devices, computing devices or other processing devices connected to wireless modems, as well as various forms of user equipment, mobile stations (MS), terminal device and so on, which have wireless communication functions. For convenience of description, the devices mentioned above are collectively referred to as terminal devices. The access network device 120 and the terminal device 13 communicate with each other through a certain air interface technology, such as a Uu interface.

The technical solutions of the embodiments of the present application can be applied to various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system. LTE Time Division Duplex (TDD) system. Advanced long term evolution (LTE-A) system. New Radio (NR) system, evolution system of NR system, LTE-based access to unlicensed spectrum (LTE-U) system, NR-U system, Universal Mobile Telecommunication System (UMTS), Worldwide Interoperability for Microwave Access (WiMAX) communication system. Wireless Local Area Networks (WLAN), Wireless Fidelity (WiFi), next-generation communication systems or other communication systems, etc.

Generally speaking, the number of connections supported by traditional communication systems is limited and easy to implement. However, with the development of communication technology, mobile communication systems will not only support traditional communication, but also support, for example, Device to Device (D2D) communication, Machine to Machine (M2M) communication, Machine Type Communication (MTC). Vehicle to Vehicle (V2V) communication and Vehicle to everything (V2X) system, etc. The embodiments of the present application may also be applied to these communication systems.

Figure 5:
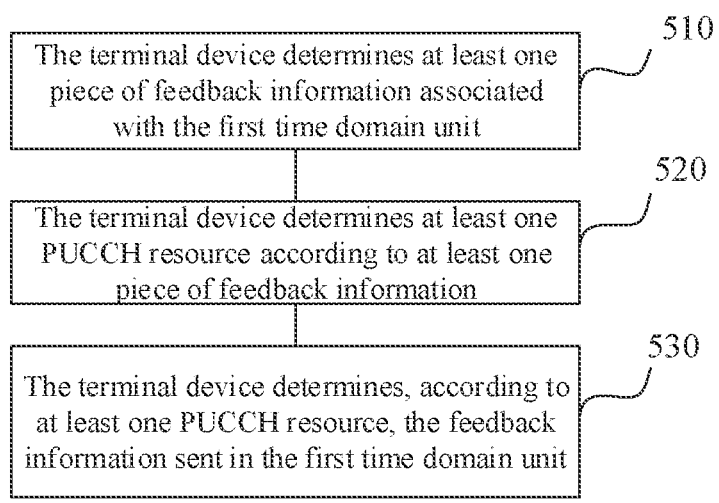
FIG. 5 illustrates a flowchart of an information transmission method provided by an exemplary embodiment of the present application.

FIG. 5 shows a flowchart of an information transmission method provided by an exemplary embodiment of the present application, which is applied to the terminal device and the network device as shown in FIG. 4, and the method includes at least some of the following contents:

510. The terminal device determines at least one piece of feedback information associated with the first time domain unit.

In this embodiment of the present application, the network device pre-configures SPS PDSCH transmission parameters for data transmission for the terminal device, and the terminal device receives the SPS PDSCH sent by the network device according to the configured SPS PDSCH transmission parameters.

In the embodiment, the first time domain unit is one of multiple preconfigured time domain units acquired by the terminal device. The at least one piece of feedback information includes undeferred feedback information and deferred feedback information.

In some embodiments, the feedback information includes ACK (Acknowledgment, positive response) information or NACK (Negative Acknowledgment, negative response) information. The ACK information is used to instruct that the terminal device confirms the reception of the SPS PDSCH. The NACK information is used to instruct that the terminal device confirms that the SPS PDSCH has not been received.

The undeferred feedback information includes feedback information corresponding to the first SPS PDSCH, and the first time domain unit is a time domain unit determined according to the feedback duration and used for transmitting the feedback information corresponding to the first SPS PDSCH. The deferred feedback information includes the feedback information of the unsuccessful transmission in the second time domain unit, the feedback information of the unsuccessful transmission in the second time domain unit is the feedback information corresponding to the second SPS PDSCH, and the second time domain unit is a time domain unit used to transmit feedback information corresponding to the second SPS PDSCH according to the feedback duration.

The feedback duration is the duration for the terminal device to send the feedback information corresponding to the SPS PDSCH after receiving the SPS PDSCH. For example, if the feedback duration is one time slot, the terminal device receives the SPS PDSCH in the first time slot, and sends the feedback information corresponding to the SPS PDSCH in the second time slot. While if the feedback duration is 2 time slots, the terminal device receives the SPS PDSCH in the first time slot, and sends the feedback information corresponding to the SPS PDSCH in the third time slot.

In addition, at least one piece of feedback information associated with the first time domain unit includes feedback information about unsuccessful transmission in the second time domain unit, indicating that the second time domain unit is located before the first time domain unit.

In some embodiments, the first time domain unit is a time slot, or the first time domain unit is a sub-slot, or the first time domain unit is at least one time domain symbol, and the first time domain unit is not limited in the embodiment of the present application.

In some embodiments, the terminal device determines at least one second time domain unit that is located before the first time domain unit and is spaced from the first time domain unit by a multiple of the feedback duration, and determines the feedback information of the unsuccessful transmission on at least one second time domain unit as the feedback information associated with the first time domain unit.

For example, the first time domain unit being a time slot is taken as an example for description. If the first time domain unit is time slot 4, and the feedback duration is 1 time slot, the time domain units before the first time domain unit are respectively time slot 1, time slot 2, and time slot 3, and the time slot 1 is spaced from the time slot 4 by twice of the feedback duration, the time slot 2 is spaced from the time slot 4 by 1 time of the feedback duration, the time slot 3 is spaced from the time slot 4 by 0 times of the feedback duration, and then the feedback information of unsuccessful transmission on the time slot 1, time slot 2 and time slot 3 is determined as the feedback information associated with the first time domain unit.

In some other embodiments, the time domain unit determined by the terminal device for transmitting the second SPS PDSCH is before the first time domain unit, and is space from the first time domain unit by a time domain length not greater than the maximum defer length.

In the embodiment of the present application, a maximum defer length is configured, and the maximum defer length is used to control the time length during which the feedback information corresponding to the SPS PDSCH can be deferred for transmission. For example, if the maximum defer length is 3 time slots and the feedback duration is 1 time slot, and the terminal device receives the SPS PDSCH in the first time slot, then the feedback information corresponding to the SPS PDSCH is transmitted in the fifth time slot at the latest, if the fifth time slot is exceeded, the feedback information will not be transmitted again.

For example, the first time domain unit being a time slot is taken as an example for description. If the first time domain unit is time slot 4, and the feedback duration is 1 time slot, the time domain units before the first time domain unit are respectively time slot 1, time slot 2, and time slot 3, and the time slot 1 is spaced from the time slot 4 by twice of the feedback duration, the time slot 2 is spaced from the time slot 4 by 1 time of the feedback duration, the time slot 3 is spaced from the time slot 4 by 0 times of the feedback duration, and then the feedback information of unsuccessful transmission on the time slot 1, time slot 2 and time slot 3 is determined as the feedback information associated with the first time domain unit.

520. The terminal device determines at least one PUCCH resource according to at least one piece of feedback information.

In this embodiment of the present application, the terminal device determines at least one piece of feedback information associated with the first time domain unit, and then determines at least one PUCCH resource that meets requirements according to the number of bits of the at least one piece of feedback information.

In the embodiment, the network device pre-configures the PUCCH resource used for transmitting information for the terminal device. For example, a terminal device acquires two PUCCH resources in one time slot, and the two PUCCH resources are respectively a first PUCCH resource and a second PUCCH resource, and the first PUCCH resource and the second PUCCH resource are both configured by the network device.

In some embodiments, the number of bits carried by the PUCCH resource pre-configured by the network device for the terminal device is different. For example, if the network device configures two PUCCH resources for the terminal device, namely the first PUCCH resource and the second PUCCH resource, the first PUCCH resource carries at most 2 bits of feedback information, and the second PUCCH resource carries more than 2 bits of feedback information. Alternatively, the PUCCH resource can also carry information of other number of bits, and this embodiment of the present application does not limit the PUCCH resource configured by the network device for the terminal device.

In some embodiments, the terminal device determines at least one PUCCH resource according to the total number of bits of the deferred feedback information and the undeferred feedback information included in the at least one piece of feedback information.

In the embodiment of the present application, the terminal device determines the PUCCH resource according to the total number of bits of the deferred feedback information and the undeferred feedback information and the number of bits that can be carried by the PUCCH resource.

For example, if the total number of bits of the deferred feedback information and the undeferred feedback information is 6 bits, the maximum number of bits that can be carried by the PUCCH resource is 8 bits, it indicates that the number of bits that can be carried by the PUCCH resource is greater than the total number of bits of the deferred feedback information and the undeferred feedback information, and thus can carry these feedback information.

For another example, if the total number of bits of the deferred feedback information and the undeferred feedback information is 6 bits, and the maximum number of bits that can be carried by the PUCCH resource is 2 bits, it indicates that the number of bits that can be carried by the PUCCH resource is smaller than the total number of bits of the deferred feedback information and the undeferred feedback information, and it cannot carry these feedback information.

In some embodiments, the terminal device determines at least one PUCCH resource according to the number of bits of undeferred feedback information included in the at least one piece of feedback information.

In the embodiment of the present application, the terminal device determines the PUCHH resource according to the number of bits of the undeferred feedback information and the number of bits that can be carried by the PUCCH resource.

For example, if the number of bits of the undeferred feedback information is 1 bit, and the maximum number of bits that can be carried by the PUCCH resource is 2 bits, it indicates that the number of bits that can be carried by the PUCCH resource is greater than the total number of bits of the undeferred feedback information, and the undeferred feedback information can be carried.

For another example, if the number of bits of the undeferred feedback information is 4 bits, and the maximum number of bits that can be carried by the PUCCH resource is 2 bits, it indicates that the number of bits that can be carried by the PUCCH resource is less than the total number of bits of the undeferred feedback information, and the undeferred feedback information cannot be carried.

530. The terminal device determines, according to at least one PUCCH resource, the feedback information sent in the first time domain unit.

In the embodiment of the present application, after the terminal device determines the PUCCH resource that can carry the feedback information, it also needs to determine the feedback information transmitted in the first time domain unit according to whether the PUCCH resource is available.

In some embodiments, if the terminal device determines the first PUCCH resource according to the total number of bits of the deferred feedback information and undeferred feedback information included in at least one piece of feedback information, and the first PUCCH resource is available, the terminal device determines that the feedback information sent in the in the first time domain includes the deferred feedback information and undeferred feedback information.

In other embodiments, the terminal device determines the first PUCCH resource according to the total number of bits of the deferred feedback information and undeferred feedback information included in at least one piece of feedback information, and determines the second PUCCH resource according to the number of bits of the undeferred feedback information, and the first PUCCH resource is unavailable, the second PUCCH resource is available, and the terminal device determines that the feedback information sent in the first time domain unit includes the undeferred feedback information.

In the embodiment, if the terminal device determines that the feedback information sent in the first time domain unit includes the undeferred feedback information, the terminal device clears the deferred feedback information in at least one piece of feedback information.

In some embodiments, the terminal device clearing the deferred feedback information in at least one piece of feedback information may also be replaced with any one of:
(1) The terminal device discards the deferred feedback information in at least one piece of feedback information.
(2) The terminal device cancels the deferred feedback information in at least one piece of feedback information.
(3) The terminal device skips the deferred feedback information in at least one piece of feedback information.
(4) The terminal device does not store the deferred feedback information in at least one piece of feedback information.

Figure 6:
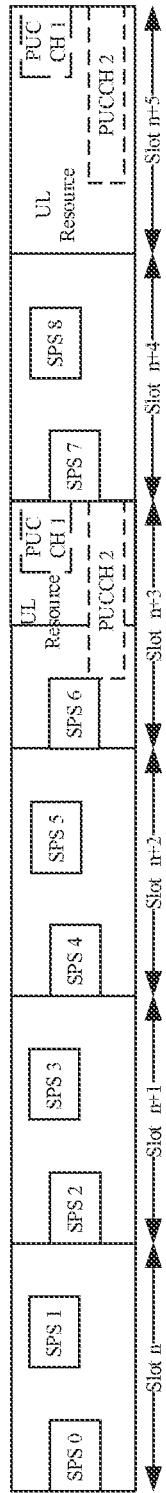
FIG. 6 illustrates a schematic diagram of an SPS configuration provided by an exemplary embodiment of the present application.

For example, as shown in FIG. 6, the time domain unit being a slot is taken as an example for description. The feedback information of SPS PDSCH 0 and SPS PDSCH 1 in time slot n is transmitted in time slot n+1, but this time slot is a downlink time slot, and the feedback information cannot be transmitted, so the corresponding feedback information needs to be deferred. The feedback information of SPS PDSCH 2 and SPS PDSCH 3 in time slot n+1 is transmitted in time slot n+2, but this time slot is a downlink time slot, and the feedback information cannot be transmitted, so the corresponding feedback information needs to be deferred. The feedback information of SPS PDSCH 4 and SPS PDSCH 5 in slot n+2 is transmitted in slot n+3. If only the 2-bit feedback information corresponding to SPS PDSCH 4 and SPS PDSCH 5 is transmitted in time slot n+3, the PUCCH resource 1 is used, and the time domain symbols occupied by the PUCCH resource 1 are all uplink symbols, that is, the PUCCH resource 1 is available. However, to transmit the 6-bit feedback information corresponding to SPS PDSCH 0-5 in time slot n+3, the PUCCH resource 2 needs to be used, but the time-domain symbols occupied by the PUCCH resource 2 include downlink symbols, that is, the PUCCH resource 2 is not available. Therefore, the terminal device determines that the 2-bit feedback information corresponding to SPS PDSCH 4 and SPS PDSCH 5 is transmitted in time slot n+3, and clears the feedback information of SPS PDSCH 0-3.

It should be noted that the embodiment of the present application is only described by taking whether the PUCCH resource is available as an example. In another embodiment, how to judge whether the PUCCH resource is unavailable will be described.

In some embodiments, the PUCCH resources being not available include:

The time-domain symbols occupied by PUCCH resources include at least one of:
(1) a downlink time domain symbol.
(2) a flexible time domain symbol.
(3) a time-domain symbol occupied by the broadcast channel.
(4) a time-domain symbol occupied by the synchronization channel.
(5) a time-domain symbol occupied by downlink reference symbol.
(6) a time-domain symbol occupied by the control channel.
(7) a time-domain symbol pre-configured by the network device.

In the embodiment, if the time-domain symbol in the PUCCH resource includes at least one of the following time-domain symbols, it indicates that the time-domain symbol in the PUCCH resources cannot be used for uplink transmission, and it indicates that the PUCCH resource is not available.

In some other embodiments, the availability of the PUCCH resource and the unavailability of the PUCCH resource are opposite conditions, and if the terminal device determines that the PUCCH resource does not meet the condition of unavailability, it determines that the PUCCH resource is available.

In some other embodiments, the terminal device may also determine whether the PUCCH resource is available according to whether the PUCCH resource includes the following time domain symbols:
(1) the time-domain symbols occupied by the PUCCH resource are uplink symbols.
(2) the time-domain symbols occupied by PUCCH resources do not include downlink symbol, time-domain symbol occupied by broadcast channels, or time-domain symbol occupied by synchronization channel.

If the terminal device determines that the time-domain symbols occupied by the PUCCH resource is any of the above two situations, it indicates that the PUCCH resource is an available resource.

It should be noted that the embodiment of the present application is only described by taking the determination of the feedback information sent in the first time domain unit from at least one piece of feedback information as an example. In another embodiment, at least one piece of feedback information associated with the time domain unit obtained by the terminal device includes feedback information corresponding to multiple SPS PDSCHs, and the HARQ processes carried by the multiple SPS PDSCHs are different.

In the embodiment, for different manners in which the terminal device controls the HARQ processes carried by multiple SPS PDSCHs, reference is made to the method shown in FIG. 7 below.

The embodiment of the present application provides an information transmission method. According to the feedback information associated with the first time domain unit, the PUCCH resources that meet the requirements are determined, and from at least one piece of feedback information, according to the PUCCH resources, the feedback information that can be transmitted in the first time domain unit is determined, which ensures that the sent feedback information meets the transmission requirements. The remaining feedback information does not need to be transmitted, ensuring that the deferred feedback information will not affect the timing relationship of the PDSCH, improving the accuracy of the feedback information transmission, and also improving the transmission stability of the feedback information.

The embodiment in FIG. 5 illustrates how the terminal device determines feedback information according to at least one piece of feedback information and PUCCH resources as an example. In another embodiment, if the target information determined by the terminal device is null, the terminal device will also determine the feedback information according to the third time domain unit located after the first time domain unit, specifically referring to the embodiment in FIG. 7:

710. If the terminal device determines that the feedback information sent in the first time domain unit is null, at least one piece of feedback information associated with the third time domain unit is determined.

In the embodiment of this application, the feedback information sent by the terminal device in the first time domain unit determined through the above steps 510-530 is null, indicating that the first time domain unit still cannot transmit feedback information at this time, and the terminal device needs to obtain, according to a third time domain unit subsequent to the first time domain unit, at least one piece of feedback information associated with the third time domain unit.

In some embodiments, if the terminal device determines the first PUCCH resource according to the total number of bits of the deferred feedback information and undeferred feedback information included in the at least one piece of feedback information, and the first PUCCH resource is not available, the terminal device determines that at the feedback information sent in the first time domain unit is null.

In other embodiments, the terminal device determines the first PUCCH resource according to the total number of bits of the deferred feedback information and undeferred feedback information included in at least one piece of feedback information, and determines the second PUCCH resource according to the number of bits of the undeferred feedback information, also, the first PUCCH resource is not available, and the second PUCCH resource is not available, and the terminal device determines that the feedback information sent in the first time domain unit is null.

In the embodiment, the process for the terminal device to determine at least one piece of feedback information associated with the third time domain unit is similar to step 510, and will not be repeated here.

720. The terminal device determines at least one PUCCH resource according to at least one piece of feedback information.

730. The terminal device determines, according to at least one PUCCH resource, the feedback information sent in the first time domain unit.

In the embodiment, steps 720-730 are similar to the above steps 520-530, and will not be repeated here.

It should be noted that the embodiment of the present application is only described by taking the determination of the feedback information according to the third time domain unit when the feedback information is null as an example. In some other embodiments, if the feedback information sent in the first time domain unit is null, first determine whether the third time domain unit located after the first time domain unit includes PUCCH resources, and if it does not include PUCCH resources, obtain a fourth time domain unit located after the third time domain unit and continue to judge whether the fourth time domain unit includes PUCCH resources, and the step 710 is performed until it is determined that the time domain unit includes PUCCH resources.

For example, the steps of the embodiment of the present application will be described with reference to FIG. 6. If the first time domain unit determined by the terminal device is time slot n, and the time slot n is a downlink time slot and does not include PUCCH resources, the time slot n is skipped. The terminal device then determines the feedback information associated with the time slot n+1, and the time slot n+1 is a downlink time slot and does not include PUCCH resources, so the time slot n+1 is skipped. The terminal device then determines the feedback information associated with the time slot n+2, and the time slot n+2 is a downlink time slot and does not include PUCCH resources, so the time slot n+2 is skipped. The terminal device then determines that the feedback information associated with time slot n+3 includes the feedback information corresponding to SPS PDSCH 0-5, and the number of bits is 6. The terminal device determines the PUCCH resource 2, and part of the symbols occupied by PUCCH resource 2 are downlink symbols, which indicates that the PUCCH resource is not available because the terminal device determines that the feedback information sent in time slot n+3 is null. The terminal device then determines the feedback information associated with time slot n+4, and the time slot n+4 is a downlink time slot and does not include PUCCH resources, then the terminal device determines that the feedback information sent in time slot n+4 is null, and skips time slot n+4. The terminal device then determines that the feedback information associated with time slot n+5 includes the feedback information corresponding to SPS PDSCH 4-8, and the number of bits is 5, and determines the PUCCH resource 2, and the symbols occupied by the PUCCH resource 2 are all uplink symbols, so the terminal device determines that the PUCCH resource 2 is available, and the feedback information of SPS PDSCH 4-8 is sent in slot n+5.

In the method provided by the embodiment of this application, the terminal device first determines whether the time domain unit located after the first time domain unit includes PUCCH resources, and if no, directly skips the time domain unit, and continues to determine whether the next time domain unit includes PUCCH resources, which can improve the execution efficiency of the terminal device.

It should be noted that the above examples are only described from the perspective of the time domain unit. In another embodiment, description may also be made from the perspective of SPS PDSCH.

For example, taking the maximum feedback defer length of 2 time slots as an example, description will be made with reference to FIG. 6 as an example. The time slot of the first SPS PDSCH received by the terminal device is time slot n+2, then the feedback information corresponding to the first SPS PDSCH needs to be transmitted in time slot n+3, and the first time domain unit determined by the terminal device is time slot n+3, and the feedback information associated with time slot n+3 includes feedback information corresponding to SPS PDSCH 0-5, the number of bits is 6, the terminal device determines the PUCCH resource 2, and the PUCCH resource 2 includes downlink symbols, indicating that the PUCCH resource 2 is not available, so the terminal device determines that the feedback information sent in slot n+3 is null. The terminal device then determines the next time slot n+4, and the time slot n+4 does not include PUCCH resources, indicating that the time slot n+4 cannot send feedback information, and the time slot n+4 is skipped. The terminal device then determines that the feedback information associated with time slot n+5 includes the feedback information corresponding to SPS PDSCH 4-8, the number of bits is 5, the PUCCH resource 2 is determined, and the symbols occupied by the PUCCH resource 2 are all uplink symbols, so the terminal device determines that the PUCCH resource 2 is available, the feedback information of SPS PDSCH 0-3 is no longer transmitted, and the feedback information of SPS PDSCH 4-8 is transmitted in slot n+5.

In the method provided by the embodiment of this application, if the feedback information sent in the first time domain unit is null, the terminal device will continue to determine the PUCCH resources that meet the requirements according to the feedback information associated with the next time domain unit, and determines the feedback information that can be transmitted in the first time domain unit according to the PUCCH resource, thereby ensuring that the transmitted feedback information meets the transmission requirements. The remaining feedback information does not need to be transmitted, thereby ensuring that the feedback information corresponding to the SPS PDSCH can be transmitted, preventing the case where the feedback information cannot be transmitted. Also, the timing relationship of the PDSCH will not be affected by the defer of the feedback information, the transmission accuracy of the feedback information is improved, and the transmission stability of the feedback information is also improved.

Figure 7:
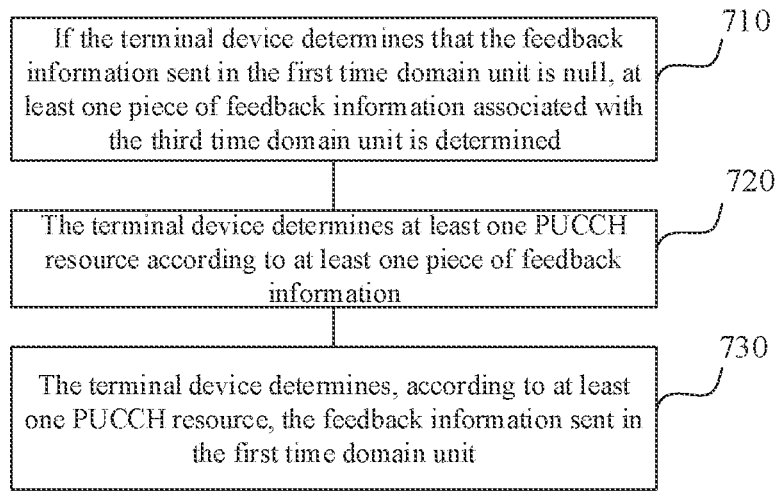
FIG. 7 illustrates a flowchart of an information transmission method provided by an exemplary embodiment of the present application.

It should be noted that the embodiments in FIG. 5 and FIG. 7 are only described by taking how the terminal device determines the feedback information sent in the first time domain unit as an example. In another embodiment, the network device will also determine the feedback information received in the first time domain unit according to at least one piece of feedback information associated with the first time domain unit. Specifically, referring to FIG. 8, the method includes:

810. The network device determines at least one piece of feedback information associated with the first time domain unit.

In the embodiment, at least one piece of feedback information includes undeferred feedback information and deferred feedback information, the undeferred feedback information includes feedback information corresponding to the first SPS PDSCH, and the first time domain unit is a time domain unit determined according to the feedback duration for transmitting the feedback information corresponding to the first SPS PDSCH, the deferred feedback information includes the feedback information of the unsuccessful transmission in the second time domain unit, the feedback information of the unsuccessful transmission in the second time domain unit is the feedback information corresponding to the second SPS PDSCH, the second time domain unit is a time domain unit determined according to the feedback duration for transmitting the feedback information corresponding to the second SPS PDSCH, and the second time domain unit is located before the first time domain unit.

In some embodiments, the time domain unit used for transmitting the second SPS PDSCH is before the first time domain unit, and the time domain length between the first time domain unit and the first time domain unit is not greater than the maximum defer length.

In some embodiments, at least one piece of feedback information includes feedback information corresponding to multiple SPS PDSCHs, and the HARQ processes carried by the multiple SPS PDSCHs are different.

In the embodiment, the first time domain unit is a time slot, or the first time domain unit is a sub-slot, or the first time domain unit is at least one time domain symbol.

820. The network device determines at least one PUCCH resource according to at least one piece of feedback information.

In the embodiment, the process of steps 810-820 is similar to the above-mentioned steps 510-520, and will not be repeated here.

830. The network device determines, according to at least one PUCCH resource, the feedback information received in the first time domain unit.

In some embodiments, at least one PUCCH resource includes a first PUCCH resource, and the first PUCCH resource is determined according to the total number of bits of the undeferred feedback information and the deferred feedback information.

In the embodiment, according to at least one PUCCH resource, determining the feedback information received in the first time domain unit includes: if the first PUCCH resource is available, the feedback information received in the first time domain unit includes the undeferred feedback information and deferred feedback information.

In some other embodiments, at least one PUCCH resource includes a first PUCCH resource and a second PUCCH resource, the first PUCCH resource is determined according to the total number of bits of the undeferred feedback information and the deferred feedback information, and the second PUCCH resource is determined according to the number of bits of the undeferred feedback information.

In the embodiment, according to at least one PUCCH resource, determining the feedback information received in the first time domain unit includes: if the first PUCCH resource is not available, and the second PUCCH resource is available, the feedback information received in the first time domain unit includes the undeferred feedback information.

It should be noted that, the embodiment of the present application is only described by using an example in which the network device determines that the feedback information received in the first time domain unit is not null. In another embodiment, if the feedback information sent in the first time domain unit is null, at least one piece of feedback information associated with the third time domain unit is determined. Wherein, the third time domain unit is located after the first time domain unit.

In some embodiments, the at least one PUCCH resource includes the first PUCCH resource, and the first PUCCH resource is not available; wherein, the first PUCCH resource is determined according to the total number of bits of the undeferred feedback information and the deferred feedback information.

In some other embodiments, the at least one PUCCH resource includes a first PUCCH resource and a second PUCCH resource, and the first PUCCH resource is not available; wherein, the first PUCCH resource is determined according to the total number of bits of the undeferred feedback information and deferred feedback information, the second PUCCH resource is determined according to the number of bits of the undeferred feedback information.

In some embodiments, the PUCCH resource being not available include:

The time-domain symbols occupied by the PUCCH resources include at least one of:
- a downlink time domain symbol;
- a flexible time domain notation;
- a time domain symbol occupied by the broadcast channel;
- a time domain symbol occupied by the synchronization channel;
- a time domain symbol occupied by the downlink reference symbol;
- a time domain symbol occupied by the control channel; and
- a time domain symbol pre-configured by the network device.

In the embodiment, the process of step 830 is similar to the processes of step 530 and steps 710-730 described above, and will not be repeated here.

Figure 8:
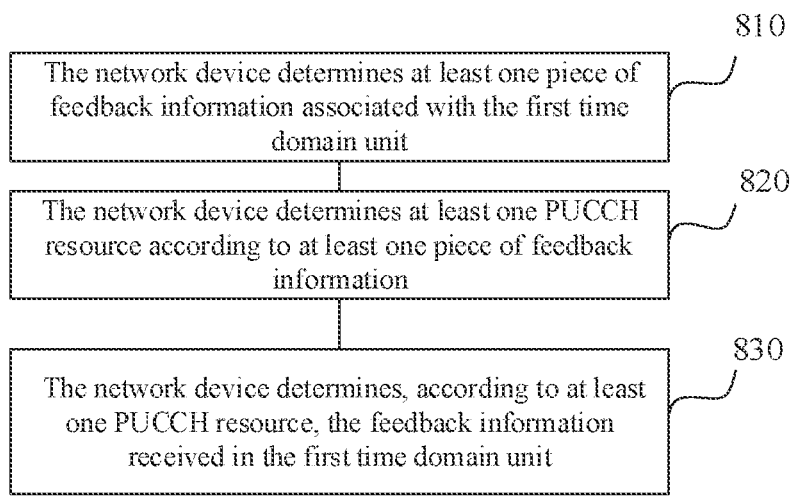
FIG. 8 illustrates a flowchart of an information transmission method provided by an exemplary embodiment of the present application.

It should be noted that the embodiment in FIG. 8 in this application may be combined with the embodiment in FIG. 5 or FIG. 7 above, which is not limited in this application.

The embodiment of the present application provides an information transmission method. According to the feedback information associated with the first time domain unit, the PUCCH resources that meet the requirements are determined, and from at least one piece of feedback information, according to the PUCCH resources, the feedback information can be transmitted in the first time domain unit is determined, which ensures that the sent feedback information meets the transmission requirements. The remaining feedback information does not need to be transmitted, ensuring that the deferred feedback information will not affect the timing relationship of the PDSCH, improving the accuracy of the feedback information transmission, and also improving the transmission stability of the feedback information.

Figure 9:
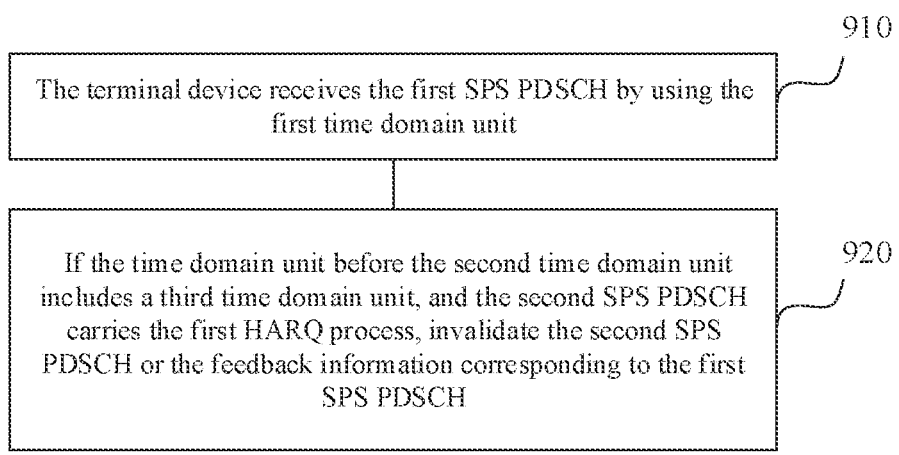
FIG. 9 illustrates a flowchart of an information transmission method provided by an exemplary embodiment of the present application.

FIG. 9 shows a flowchart of an information transmission method provided by an exemplary embodiment of the present application, which is applied to the terminal device shown in FIG. 4, and the method includes at least some of the following contents.

910. The terminal device receives the first SPS PDSCH by using the first time domain unit.

The first SPS PDSCH carries the first HARQ process, and the feedback information corresponding to the first SPS PDSCH is transmitted through the second time domain unit. The second time domain unit is a time domain unit corresponding to the deferred transmission of the feedback information corresponding to the first SPS PDSCH, or is a time domain unit corresponding to the undeferred transmission of the feedback information the first SPS PDSCH.

In this embodiment of the present application, the network device sends the first SPS PDSCH to the terminal device in the first time domain unit, and the terminal device receives the first SPS PDSCH in the first time domain unit.

920. If the time domain unit before the second time domain unit includes a third time domain unit, and the second SPS PDSCH carries the first HARQ process, invalidate the second SPS PDSCH or the feedback information corresponding to the first SPS PDSCH.

In the embodiment, the third time domain unit is used to transmit the second SPS PDSCH.

In the embodiment of this application, if the terminal device receives the first SPS PDSCH in the first time domain unit, and the time domain unit that sends the feedback information corresponding to the first SPS PDSCH is the second time domain unit, then before the second time domain unit, if there is a second SPS PDSCH carrying the same HARQ process as that carried by the first SPS PDSCH, the terminal device will invalidate the feedback information corresponding to the first SPS PDSCH or the second SPS PDSCH in order to prevent timing confusion.

In some embodiments, invalidating the feedback information corresponding to the first SPS PDSCH by the terminal device includes: clearing the feedback information corresponding to the first SPS PDSCH.

In the embodiment, the terminal device clearing the feedback information corresponding to the first SPS PDSCH can also be replaced by any of:

(1) The terminal device discards the feedback information corresponding to the first SPS PDSCH.

(2) The terminal device cancels the feedback information corresponding to the first SPS PDSCH.

(3) The terminal device skips the feedback information corresponding to the first SPS PDSCH.

(4) The terminal device does not store the feedback information corresponding to the first SPS PDSCH.

Figure 10:
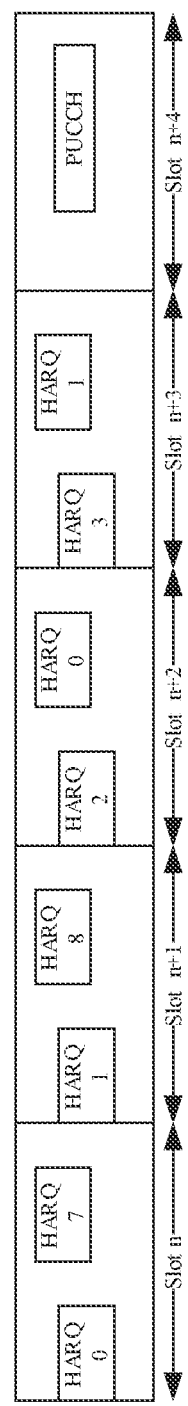
FIG. 10 illustrates a schematic diagram of an SPS configuration provided by an exemplary embodiment of the present application.

For example, as shown in FIG. 10, two SPS PDSCHs are configured in each time slot n–n+3, and the two SPS PDSCHs in time slot n carry HARQ process 0 and HARQ process 7 respectively. The two SPS PDSCHs in slot n+1 carry HARQ process 1 and HARQ process 8 respectively, the two SPS PDSCHs in time slot n+2 carry HARQ process 2 and HARQ process 0 respectively, and the two SPS PDSCHs in time slot n+3 carry HARQ process 3 and HARQ process 1 respectively. If the first SPS PDSCH received by the terminal device in time slot n carries HARQ process 0, and the feedback information corresponding to the first SPS PDSCH is transmitted in time slot n+4, and there is a second SPS PDSCH carrying HARQ process 0 in time slot n+2, the terminal device needs to perform invalidation processing on the second SPS PDSCH or the feedback information corresponding to the first SPS PDSCH.

In some other embodiments, the terminal device performing invalidation processing on the second SPS PDSCH includes: the terminal device does not receive the second SPS PDSCH on the third time domain unit.

In some other embodiments, if the terminal device receives the dynamic scheduling PDSCH before the second time domain unit, and the dynamic scheduling PDSCH carries the second HARQ process, the terminal device transmits the corresponding feedback according to the received dynamic scheduling PDSCH information, and does not need to perform the step 920.

In the method provided by the embodiment of this application, the terminal device will determine the second time domain unit that transmits the corresponding feedback information according to the received SPS PDSCH in the first time domain unit, and if there is a third time domain unit that is located before the second time domain unit and carrying the same HARQ process as the SPS PDSCH, at this time, the feedback information corresponding to the SPS PDSCH received in the first time domain unit has not been transmitted, and the second SPS PDSCH carrying the same HARQ process cannot be received. Then the second SPS PDSCH or the feedback information corresponding to the first SPS PDSCH is invalidated to prevent the PDSCH timing confusion caused by carrying the same HARQ process, improve the transmission accuracy of the feedback information, and improve the transmission stability of the feedback information.

Figure 11:
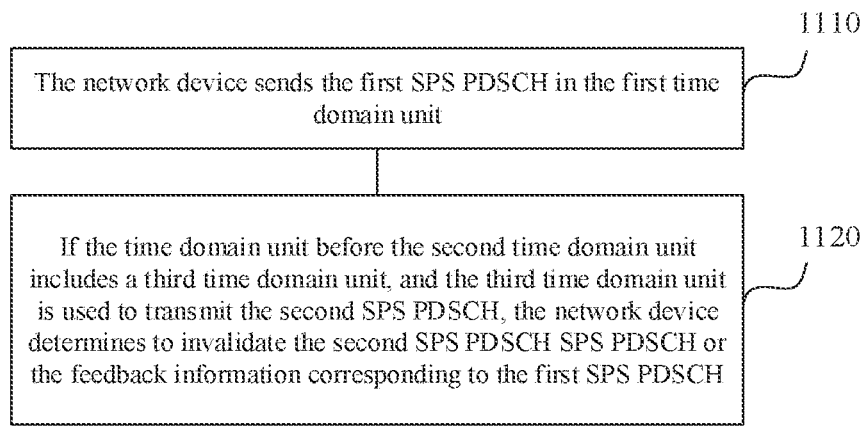
FIG. 11 illustrates a flowchart of an information transmission method provided by an exemplary embodiment of the present application.

The embodiment in FIG. 9 illustrates the process of how the terminal device performs invalidation processing on the second SPS PDSCH or the feedback information corresponding to the SPS PDSCH, and the network device will also determine how the terminal device performs invalidation processing on the second SPS PDSCH or the feedback information corresponding to the SPS PDSCH, and then determine how to execute the subsequent process, the following FIG. 11 shows a flow chart of an information transmission method provided by an exemplary embodiment of the present application, as shown in FIG. 11, the method includes;

1110. The network device sends the first SPS PDSCH in the first time domain unit.

In the embodiment, the first SPS PDSCH carries the first HARQ process, and the feedback information corresponding to the first SPS PDSCH is transmitted in the second time domain unit.

The process of step 1110 is similar to the above step 910, and will not be repeated here.

1120. If the time domain unit before the second time domain unit includes a third time domain unit, and the third time domain unit is used to transmit the second SPS PDSCH, the network device determines to invalidate the second SPS PDSCH SPS PDSCH or the feedback information corresponding to the first SPS PDSCH.

In the embodiment, the second SPS PDSCH carries the first HARQ process.

In the embodiment of this application, if the network device sends the first SPS PDSCH in the first time domain unit, and the time domain unit that receives the feedback information corresponding to the first SPS PDSCH is the second time domain unit, then before the second time domain unit, if there is a second SPS PDSCH carrying the same HARQ process as the HARQ process carried by the first SPS PDSCH, the terminal device and the network device, in order to prevent timing confusion, the terminal device performs invalidating process on the second SPS PDSCH or the feedback information corresponding to the first SPS PDSCH, and the network device needs to determine the feedback information or the SPS PDSCH that the terminal device has invalidated.

In some other embodiments, the network device determining that the second SPS PDSCH is invalid includes: the network device does not send the second SPS PDSCH on the third time domain unit.

It should be noted that after the terminal device invalidates the feedback information corresponding to the first SPS PDSCH, the terminal device sends other feedback information in the second time domain unit except for the feedback information that has been invalidated, and the network device receives the feedback information sent by the terminal device in the second time domain unit.

In some other embodiments, if the network device sends a dynamic scheduling PDSCH before the second time domain unit, and the dynamic scheduling PDSCH carries the second HARQ process, the network device receives corresponding feedback according to the received dynamic scheduling PDSCH information, and does not need to execute the step 1120.

In the method provided by the embodiment of this application, the network device will determine the second time domain unit for transmitting the corresponding feedback information according to the SPS PDSCH sent in the first time domain unit, and if there is a third time domain unit located before the second time domain unit carrying the same HARQ process as that carried by the SPS PDSCH, while at this time, the feedback information corresponding to the SPS PDSCH received in the first time domain unit has not been transmitted, the second SPS PDSCH carrying the same HARQ process cannot be received. The second SPS PDSCH or the feedback information corresponding to the first SPS PDSCH is determined to be invalid, preventing the problem of PDSCH timing confusion caused by carrying the same HARQ process, improving the transmission accuracy of the feedback information, and also improving the transmission stability of the feedback information.

Figure 12:
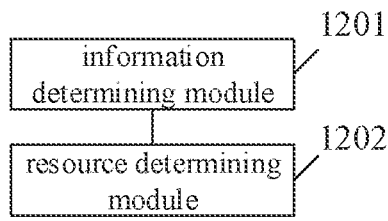
FIG. 12 illustrates a block diagram of a communication apparatus provided by an exemplary embodiment of the present application.

FIG. 12 illustrates a block diagram of an information transmission apparatus provided by an exemplary embodiment of the present application. The apparatus is configured in a terminal device, and the apparatus includes:

an information determining module 1201, configured to determine at least one piece of feedback information associated with a first time domain unit, wherein the at least one piece of feedback information includes undeferred feedback information and deferred feedback information, the undeferred feedback information includes feedback information corresponding to a first SPS PDSCH, and the first time domain unit is a time domain unit used to transmit feedback information corresponding to the first SPS PDSCH determined according to a feedback duration, and the deferred feedback information includes feedback information that was not successfully transmitted in a second time domain unit, and the feedback information that was not successfully transmitted in the second time domain unit is the feedback information corresponding to a second SPS PDSCH, and the second time domain unit is a time domain unit used to transmit feedback information corresponding to the second SPS PDSCH determined according to the feedback duration, and wherein the second time domain unit is located before the first time domain unit; and a resource determining module 1202, configured to determine at least one PUCCH resource according to the at least one piece of feedback information;

wherein the information determining module 1201 is further configured to determine feedback information sent in the first time domain unit according to the at least one PUCCH resource.

In some embodiments, the at least one PUCCH resource includes a first PUCCH resource, and the first PUCCH resource is determined according to a total number of bits of the undeferred feedback information and the deferred feedback information, the information determining module 1201 is further configured that, if the first PUCCH resource is available, the feedback information sent in the first time domain unit includes the undeferred feedback information and the deferred feedback information.

In some embodiments, the information determining module 1201 is configured that if the first PUCCH resource is not available, and the second PUCCH resource is available, the feedback information sent in the first time domain unit includes the undeferred feedback information.

Figure 13:
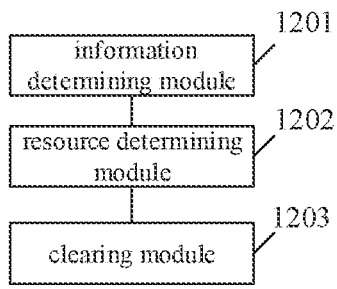
FIG. 13 illustrates a block diagram of a communication apparatus provided by an exemplary embodiment of the present application.

In some embodiments, referring to FIG. 13, the apparatus further includes:

a clearing module 1203, configured to clear the deferred feedback information.

In some embodiments, the information determining module 1201 is configured that, if the feedback information sent in the first time domain unit is null, determining at least one piece of feedback information associated with a third time domain unit:

wherein, the third time domain unit is located after the first time domain unit.

In some embodiments, the feedback information sent in the first time domain unit being null, includes:
  the at least one PUCCH resource includes a first PUCCH resource, and the first PUCCH resource is not available;
  wherein, the first PUCCH resource is determined according to a total number of bits of the undeferred feedback information and the deferred feedback information.

In some embodiments, the feedback information sent in the first time domain unit being null, includes:
  the at least one PUCCH resource includes a first PUCCH resource and a second PUCCH resource, and the first PUCCH resource is not available, the second PUCCH resource is not available;
  wherein, the first PUCCH resource is determined according to a total number of bits of the undeferred feedback information and the deferred feedback information, and the second PUCCH resource is determined according to a number of bits of the undeferred feedback information.

In some embodiments, a time domain unit used to transmit the second SPS PDSCH is before the first time domain unit, and a time domain length between the time domain unit and the first time domain unit is not greater than a maximum defer length.

In some embodiments, the PUCCH resource being not available includes:
  a time domain symbol occupied by PUCCH resources includes at least one of:
  a downlink time domain symbol;
  a flexible time domain symbol;
  a time domain symbol occupied by a broadcast channel;
  a time domain symbol occupied by a synchronization channel;
  a time domain symbol occupied by a downlink reference symbol;
  a time domain symbol occupied by a control channel;
  a time domain symbol pre-configured a network device.

In some embodiments, the at least one piece of feedback information includes feedback information corresponding to multiple SPS PDSCHs, and HARQ processes carried by the multiple SPS PDSCHs are different.

In some embodiments, the first time domain unit is a time slot, or the first time domain unit is a sub-slot, or the first time domain unit is at least one time domain symbol.

Figure 14:
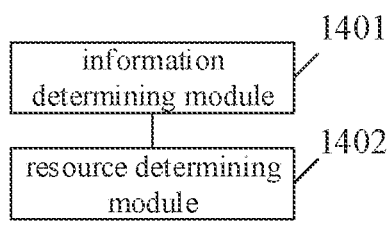
FIG. 14 illustrates a block diagram of a communication apparatus provided by an exemplary embodiment of the present application.

FIG. 14 illustrates a block diagram of an information transmission apparatus provided in an exemplary embodiment of the present application. The apparatus is configured in a network device, and the apparatus includes:
  an information determining module 1401, configured to determine at least one piece of feedback information associated with a first time domain unit, wherein the at least one piece of feedback information includes undeferred feedback information and deferred feedback information, the undeferred feedback information includes feedback information corresponding to a first SPS PDSCH, and the first time domain unit is a time domain unit used to transmit feedback information corresponding to the first SPS PDSCH determined according to a feedback duration, and the deferred feedback information includes feedback information that was not successfully transmitted in a second time domain unit, and the feedback information that was not successfully transmitted in the second time domain unit is the feedback information corresponding to a second SPS PDSCH, and the second time domain unit is a time domain unit used to transmit feedback information corresponding to the second SPS PDSCH determined according to the feedback duration, and wherein the second time domain unit is located before the first time domain unit; and
  a resource determining module 1402, configured to determine at least one PUCCH resource according to the at least one piece of feedback information;
  wherein the information determining module 1401 is configured to determine feedback information received in the first time domain unit according to the at least one PUCCH resource.

In some embodiments, the at least one PUCCH resource includes a first PUCCH resource, and the first PUCCH resource is determined according to a total number of bits of the undeferred feedback information and the deferred feedback information:
  wherein the information determining module 1401 is configured that, if the first PUCCH resource is available, the feedback information received in the first time domain unit includes the undeferred feedback information and the deferred feedback information.

In some embodiments, the at least one PUCCH resource includes a first PUCCH resource and a second PUCCH resource, the first PUCCH resource is determined according to a total number of bits of the undeferred feedback information and the deferred feedback information, and the second PUCCH resource is determined according to a number of bits of the undeferred feedback information;
  wherein the information determining module 1401 is configured that, if the first PUCCH resource is not available, and the second PUCCH resource is available, the feedback information received in the first time domain unit includes the undeferred feedback information.

In some embodiments, the information determining module 1401 is configured to, if the feedback information sent in the first time domain unit is null, determine at least one piece of feedback information associated with a third time domain unit;
  wherein, the third time domain unit is located after the first time domain unit.

In some embodiments, the feedback information sent in the first time domain unit being null, includes:
  the at least one PUCCH resource includes a first PUCCH resource, and the first PUCCH resource is not available;
  wherein, the first PUCCH resource is determined according to a total number of bits of the undeferred feedback information and the deferred feedback information.

In some embodiments, the feedback information sent in the first time domain unit being null, includes:
  the at least one PUCCH resource includes a first PUCCH resource and a second PUCCH resource, and the first PUCCH resource is not available and the second PUCCH resource is not available;
  wherein, the first PUCCH resource is determined according to a total number of bits of the undeferred feedback information and the deferred feedback information, and the second PUCCH resource is determined according to a number of bits of the undeferred feedback information.

In some embodiments, a time domain unit used to transmit the second SPS PDSCH is before the first time domain unit, and a time domain length between the time domain unit and the first time domain unit is not greater than a maximum defer length.

In some embodiments, the PUCCH resource being not available includes:
a time domain symbol occupied by PUCCH resources includes at least one of:
a downlink time domain symbol;
a flexible time domain symbol;
a time domain symbol occupied by a broadcast channel;
a time domain symbol occupied by a synchronization channel;
a time domain symbol occupied by a downlink reference symbol.
a time domain symbol occupied by a control channel, and
a time domain symbol pre-configured the network device.

In some embodiments, the at least one piece of feedback information includes feedback information corresponding to multiple SPS PDSCHs, and HARQ processes carried by the multiple SPS PDSCHs are different.

In some embodiments, the first time domain unit is a time slot, or the first time domain unit is a sub-slot, or the first time domain unit is at least one time domain symbol.

Figure 15:
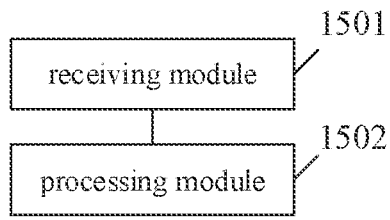
FIG. 15 illustrates a block diagram of a communication apparatus provided by an exemplary embodiment of the present application.

FIG. 15 illustrates a block diagram of an information transmission apparatus provided by an exemplary embodiment of the present application. The apparatus is configured in a terminal device, and the apparatus includes:
a receiving module 1501, configured to receive a first SPS PDSCH in a first time domain unit, wherein the first SPS PDSCH carries a first HARQ process, and feedback information corresponding to the first SPS PDSCH is transmitted in a second time domain unit; and
a processing module 1502, configured to, if a third time domain unit is includes in time domain units before the second time domain unit, and the third time domain unit is used to transmit a second SPS PDSCH, the second SPS PDSCH carries the first HARQ process, invalidate the second SPS PDSCH or the feedback information corresponding to the first SPS PDSCH.

In some embodiments, the receiving module 1501 is configured to receive a dynamically scheduled PDSCH before the second time domain unit, and the dynamically scheduled PDSCH carrying a second HARQ process.

In some embodiments, the processing module 1502 is configured to clear the feedback information corresponding to the first SPS PDSCH.

Figure 16:
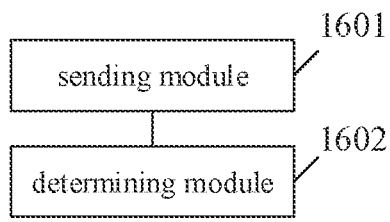
FIG. 16 illustrates a block diagram of a communication apparatus provided by an exemplary embodiment of the present application.

FIG. 16 illustrates a block diagram of an information transmission apparatus provided by an exemplary embodiment of the present application. The apparatus is configured in a network device, and the apparatus includes:
a sending module 1601, configured to send a first SPS PDSCH in a first time domain unit, wherein the first SPS PDSCH carries a first HARQ process, and feedback information corresponding to the first SPS PDSCH is transmitted in a second time domain unit; and
a determining module 1602, configured to, if a third time domain unit is included in time domain units before the second time domain unit, and the third time domain unit is used to transmit a second SPS PDSCH, the second SPS PDSCH carries the first HARQ process, determine that the second SPS PDSCH or the feedback information corresponding to the first SPS PDSCH is invalid.

In some embodiments, the apparatus further comprising:
the sending module 1601 is configured to send a dynamically scheduled PDSCH before the second time domain unit, and the dynamically scheduled PDSCH carrying a second HARQ process.

Figure 17:
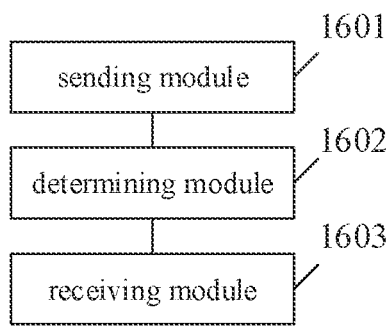
FIG. 17 illustrates a block diagram of a communication apparatus provided by an exemplary embodiment of the present application.

In some embodiments, referring to FIG. 17, the apparatus further comprising:
a receiving module 1603, configured to receive at least one piece of feedback information in the second time domain unit.

Figure 18:
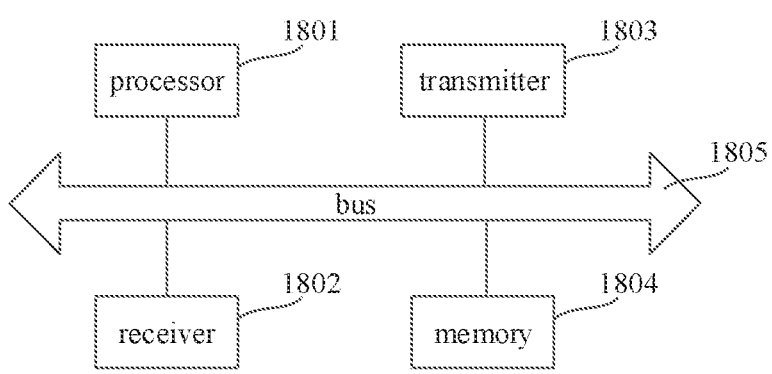
FIG. 18 illustrates a schematic structural diagram of a communication device provided by an exemplary embodiment of the present application.

FIG. 18 illustrates a schematic structural diagram of a communication device provided by an exemplary embodiment of the present application, wherein the communication device includes: a processor 1801, a receiver 1802, a transmitter 1803, a memory 1804 and a bus 1805.

The processor 1801 includes one or more processing cores, and the processor 1801 executes various functional applications and information processing by running software programs and modules.

The receiver 1802 and the transmitter 1803 can be realized as a communication component, and the communication component can be a communication chip.

The memory 1804 is connected to the processor 1801 through the bus 1805.

The memory 1804 may be used to store at least one program code, and the processor 1801 is used to execute the at least one program code, so as to implement various steps in the foregoing method embodiments.

Furthermore, the communication device may be a terminal device. The memory 1804 can be realized by any type of volatile or non-volatile storage device or their combination, volatile or non-volatile storage devices include but not limited to: magnetic disk or optical disk, electrically erasable programmable read-only memory (EEPROM), erasable programmable read only memory (EPROM), static random access memory (SRAM), read only memory (ROM), magnetic memory, flash memory, programmable read only memory (PROM).

In an exemplary embodiment, there is also provided a computer-readable storage medium, the executable program code is stored in the readable storage medium, and the executable program code is loaded and executed by the processor to implement the information transmission method performed by a communication device provided by the above method embodiments.

Those of ordinary skill in the art can understand that all or part of the steps for implementing the above embodiments can be completed by hardware, and can also be completed by instructing related hardware through a program. The program can be stored in a computer-readable storage medium. The above-mentioned storage medium may be a read-only memory, a magnetic disk or an optical disk, and the like.

The above are only optional embodiments of the application, and are not intended to limit the application. Any modifications, equivalent replacements, improvements, etc. made within the spirit and principles of the application shall be included within the protection scope of the application.

What is claimed is:

1. A method of wireless communication of a terminal device, comprising:
determining at least one piece of feedback information associated with a first time domain unit, wherein the at least one piece of feedback information comprises undeferred feedback information and deferred feedback information, the undeferred feedback information comprises feedback information corresponding to a first Semi-Persistent Scheduling (SPS) Physical Downlink Shared Channel (PDSCH), and the first time domain unit is a time domain unit used to transmit feedback information corresponding to the first SPS PDSCH determined according to a feedback duration, and the deferred feedback information comprises feedback information that was not successfully transmitted in a second time domain unit, and the feedback information that was not successfully transmitted in the second time domain unit is the feedback information corresponding to a second SPS PDSCH, and the second time domain unit is a time domain unit used to transmit feedback information corresponding to the second SPS PDSCH determined according to the feedback duration, and wherein the second time domain unit is located before the first time domain unit;

determining at least one Physical Uplink Shared Channel (PUCCH) resource according to the at least one piece of feedback information; and determining feedback information sent in the first time domain unit according to the at least one PUCCH resource.

2. The method according to claim 1, wherein:
the at least one PUCCH resource comprises a first PUCCH resource, and the first PUCCH resource is determined according to a total number of bits of the undeferred feedback information and the deferred feedback information, and the determining feedback information sent in the first time domain unit according to the at least one PUCCH resource comprises:
if the first PUCCH resource is available, the feedback information sent in the first time domain unit comprises the undeferred feedback information and the deferred feedback information.

3. The method according to claim 1, wherein:
the at least one PUCCH resource comprises a first PUCCH resource and a second PUCCH resource,
the first PUCCH resource is determined according to a total number of bits of the undeferred feedback information and the deferred feedback information,
the second PUCCH resource is determined according to a number of bits of the undeferred feedback information, and
the determining feedback information sent in the first time domain unit according to the at least one PUCCH resource comprises:
 if the first PUCCH resource is not available, and the second PUCCH resource is available, the feedback information sent in the first time domain unit comprises the undeferred feedback information.

4. The method according to claim 3, further comprising:
clearing the deferred feedback information.

5. The method according to claim 3, wherein the PUCCH resource being not available comprises:
a time domain symbol occupied by PUCCH resources comprising at least one of:
 a downlink time domain symbol,
 a flexible time domain symbol,
 a time domain symbol occupied by a broadcast channel,
 a time domain symbol occupied by a synchronization channel,
 a time domain symbol occupied by a downlink reference symbol,
 a time domain symbol occupied by a control channel, or
 a time domain symbol pre-configured a network device.

6. The method according to claim 1, further comprising:
if the feedback information sent in the first time domain unit is null, determining at least one piece of feedback information associated with a third time domain unit, wherein the third time domain unit is located after the first time domain unit.

7. The method according to claim 6, wherein the feedback information sent in the first time domain unit being null comprises at least one of:
in a case that the at least one PUCCH resource comprises a first PUCCH resource, and the first PUCCH resource is not available, the first PUCCH resource is determined according to a total number of bits of the undeferred feedback information and the deferred feedback information, or in a case that the at least one PUCCH resource comprises a first PUCCH resource and a second PUCCH resource, and the first PUCCH resource is not available, and the second PUCCH resource is not available, the first PUCCH resource is determined according to a total number of bits of the undeferred feedback information and the deferred feedback information, and the second PUCCH resource is determined according to a number of bits of the undeferred feedback information.

8. The method according to claim 1, wherein:
a time domain unit used to transmit the second SPS PDSCH is before the first time domain unit, and
a time domain length between the time domain unit and the first time domain unit is not greater than a maximum defer length.

9. The method according to claim 1, wherein:
the at least one piece of feedback information comprises feedback information corresponding to multiple SPS PDSCHs, and
Hybrid Automatic Repeat Request (HARQ) processes carried by the multiple SPS PDSCHs are different.

10. The method according to claim 1, wherein:
the first time domain unit is a time slot,
the first time domain unit is a sub-slot, or
the first time domain unit is at least one time domain symbol.

11. A terminal device, comprising:
a processor; and
a memory storing instructions, which when executed by the processor, cause the processor to:
 determine at least one piece of feedback information associated with a first time domain unit, wherein the at least one piece of feedback information comprises undeferred feedback information and deferred feedback information, the undeferred feedback information comprises feedback information corresponding to a first Semi-Persistent Scheduling (SPS) Physical Downlink Shared Channel (PDSCH), and the first time domain unit is a time domain unit used to transmit feedback information corresponding to the first SPS PDSCH determined according to a feedback duration, and the deferred feedback information comprises feedback information that was not successfully transmitted in a second time domain unit, and the feedback information that was not successfully transmitted in the second time domain unit is the feedback information corresponding to a second SPS PDSCH, and the second time domain unit is a time domain unit used to transmit feedback information corresponding to the second SPS PDSCH determined according to the feedback duration, and wherein the second time domain unit is located before the first time domain unit;

determine at least one Physical Uplink Control Channel (PUCCH) resource according to the at least one piece of feedback information; and determine feedback information sent in the first time domain unit according to the at least one PUCCH resource.

12. The terminal device according to claim 11, wherein:
the at least one PUCCH resource comprises a first PUCCH resource,
the first PUCCH resource is determined according to a total number of bits of the undeferred feedback information and the deferred feedback information, and
if the first PUCCH resource is available, the feedback information sent in the first time domain unit comprises the undeferred feedback information and the deferred feedback information.

13. The terminal device according to claim 11, wherein:
a time domain unit used to transmit the second SPS PDSCH is before the first time domain unit, and
a time domain length between the time domain unit and the first time domain unit is not greater than a maximum defer length.

14. The terminal device according to claim 11, wherein:
the at least one piece of feedback information comprises feedback information corresponding to multiple SPS PDSCHs, and
Hybrid Automatic Repeat Request (HARQ) processes carried by the multiple SPS PDSCHs are different.

15. The terminal device according to claim 11, wherein:
the first time domain unit is a time slot, or
the first time domain unit is a sub-slot, or the first time domain unit is at least one time domain symbol.

16. A network device, comprising:
a processor; and
a memory storing instructions, which when executed by the processor, cause the processor to:
determine at least one piece of feedback information associated with a first time domain unit, wherein the at least one piece of feedback information comprises undeferred feedback information and deferred feedback information, the undeferred feedback information comprises feedback information corresponding to a first Semi-Persistent Scheduling (SPS) Physical Downlink Shared Channel (PDSCH), and the first time domain unit is a time domain unit used to transmit feedback information corresponding to the first SPS PDSCH determined according to a feedback duration, and the deferred feedback information comprises feedback information that was not successfully transmitted in a second time domain unit, and the feedback information that was not successfully transmitted in the second time domain unit is the feedback information corresponding to a second SPS PDSCH, and the second time domain unit is a time domain unit used to transmit feedback information corresponding to the second SPS PDSCH determined according to the feedback duration, and wherein the second time domain unit is located before the first time domain unit;

determine at least one Physical Uplink Control Channel (PUCCH) resource according to the at least one piece of feedback information; and determine feedback information received in the first time domain unit according to the at least one PUCCH resource.

17. The network device according to claim 16, wherein:
the at least one PUCCH resource comprises a first PUCCH resource,
the first PUCCH resource is determined according to a total number of bits of the undeferred feedback information and the deferred feedback information and
if the first PUCCH resource is available, the feedback information received in the first time domain unit comprises the undeferred feedback information and the deferred feedback information.

18. The network device according to claim 16, wherein:
a time domain unit used to transmit the second SPS PDSCH is before the first time domain unit, and
a time domain length between the time domain unit and the first time domain unit is not greater than a maximum defer length.

19. The network device according to claim 16, wherein:
the at least one piece of feedback information comprises feedback information corresponding to multiple SPS PDSCHs, and
Hybrid Automatic Repeat Request (HARQ) processes carried by the multiple SPS PDSCHs are different.

20. The network device according to claim 16, wherein:
the first time domain unit is a time slot,
the first time domain unit is a sub-slot, or
the first time domain unit is at least one time domain symbol.

* * * * *